F. R. LIDDELL.
FISHING REEL.
APPLICATION FILED APR. 23, 1915.
1,305,910. Patented June 3, 1919.
2 SHEETS—SHEET 1.
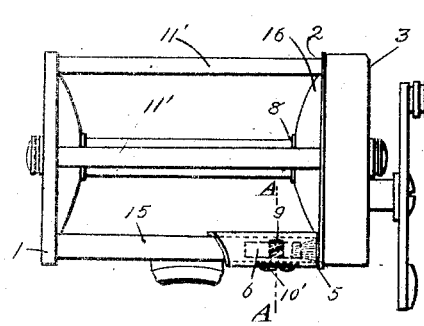
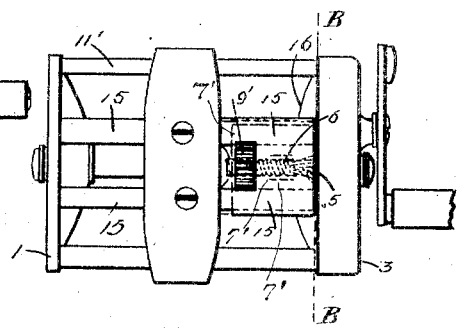
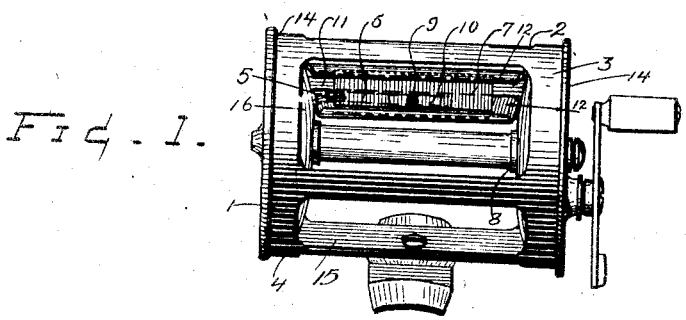
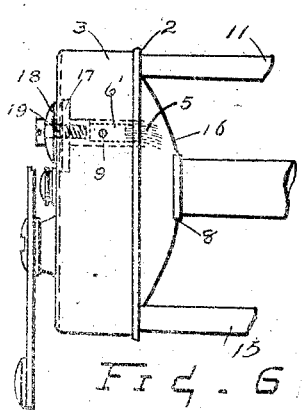
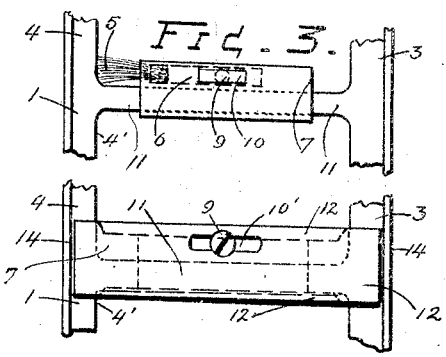
WITNESSES:
H. C. Raymond
P. Bethune
INVENTOR.
Fred R. Liddell
BY
George W. Upton
ATTORNEY.

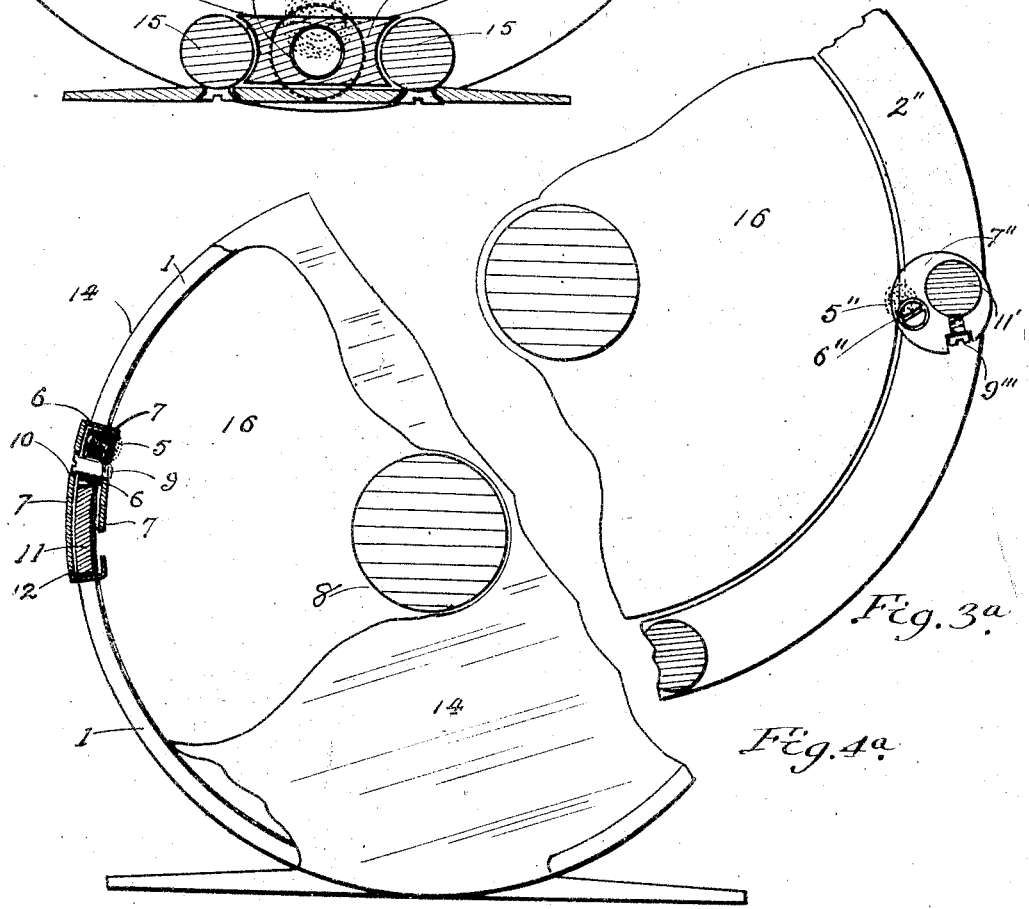

UNITED STATES PATENT OFFICE.

FRED R. LIDDELL, OF LAPORTE, INDIANA, ASSIGNOR TO GEORGE W. UPTON, OF WARREN, OHIO.

FISHING-REEL.

1,305,910.      Specification of Letters Patent.      Patented June 3, 1919.

Application filed April 23, 1915. Serial No. 23,333.

*To all whom it may concern:*

Be it known that I, FRED R. LIDDELL, a citizen of the United States of America, residing at Laporte, in the county of Laporte and State of Indiana, have invented certain new and useful Improvements in Fishing-Reels, of which the following is a specification.

My invention relates to improvements in fishing reels of the kind used for casting baits, and has for its objects: first, the provision of a device which will retard the spool of a reel during a cast sufficiently to prevent it from feeding out line faster than the out going bait pulls the line taut; second, to restrain the speed of the spool as against too rapid revolutions, without restraining it perceptibly when the out going bait is slowly drawing the line off from the reel; third, to stop the spool when the out going bait and line cease to pull on it; and, fourth, to provide simple means for the application of such a device either when it is built in as a component part of a new reel, or when its use is desired on a reel already finished and in condition only for use in the usual way, in which the speed of the spool is controlled by the use of the angler's thumb.

I attain those objects by the mechanism illustrated in the accompanying drawings, in which:—

Figure 1 illustrates a rear view of a tubular reel having nearly flat cross bars, in position to be cranked with the right hand; and with my invention attached to a forward cross bar so that the under or inner side of the device adjacent to the axle of the spool is seen.

Fig. 2 illustrates a front view of a reel with round pillars, in position to be cranked with the left hand; and with my invention between the two bottom reel seat pillars, and clamped thereto.

Fig. 3 illustrates a portion of the tubular reel shown in Fig. 1. broken away to display only one of the flat cross bars, and looking from the axle of the reel outward.

Fig. 4 illustrates the same in opposite view looking inward toward the axle.

Fig. 5 is an additional view of the ordinary round pillared reel shown in Fig. 2, taken from the bottom and looking up or inward toward the axle, and showing my invention positioned between the reel seat pillars and operated by a thumb screw.

Fig. 6 shows a modification in which like characters refer to corresponding parts throughout the other views, and in which my invention is attached to the cap of the reel instead of to its pillars.

Fig. 2ª is an enlargement of the invention as shown in Fig. 2 and is taken in cross section through the line A—A.

Fig. 5ª is an enlargement taken through the line B—B, of Fig. 5, and shows a modification with a milled thumb-screw instead of a screw with a kerf, as a retaining element; shown in cross-section.

Fig. 3ª is an enlarged view of my invention as shown in Fig. 3, used when the reel has round cross pillars instead of flat ones.

Fig. 4ª is an enlarged view in cross section of my invention as shown in Figs. 1 and 4.

Similar characters represent like parts throughout the several views.

As is well known to those skilled in the art of casting baits or lures for catching fish, and to manufacturers of reels intended for that purpose, the angler when using ordinary reels winds up his line until the bait is but a few inches from the end of the rod; rests his thumb on the line spooled on the reel; throws the bait a distance by a smart swing of the rod, having released the spool by lifting his thumb slightly, and then allows the thumb to drag with more or less pressure on the coiled line as it goes out, or on the revolving flange of the spool, to prevent the paying out of the line at a faster rate than the momentum of the bait draws it taut.

Did he not do so the coils of the line would loosen on the spool and over run because of their own velocity and centrifugal force, and begin to rewind themselves on the rotating spool in reverse; causing the line to wind backward, or "back-lash" on the spool, thereby instantly stopping the outward flight of the bait with a sharp jerk.

By the use of my invention, whether built into and as a part of the reel, or whether attached thereto afterward by any means, examples of which I describe for purposes of illustration, without limiting myself to their specific forms or parts; the control of the spool by the caster's thumb is not required. As that control is one which is only attained after and by means of much practice and then with but a modicum of certainty, it will be appreciated that my invention is of great utility, convenience and value.

For use with what is commercially known as a tubular reel, constructed by cutting away parts from a length of metal cylinder or tube 4, and heading the ends of the same with a tail-plate 1 and a head to which may be attached the gears and other winding mechanism of the reel, also under said protecting cap, 3, I start with a resilient element made from any material suitable to produce a brush like end to contact with a flange of a reel's spool; the brush may be made of fiber, hair, whalebone and the like, or of more enduring material such as leather for instance.

Such an element I have illustrated throughout the drawings as a brush, and will refer to it as brush 5; meaning to include thereby any and all resilient equivalents.

I fasten a brush 5 to a stem 6 and provide a suitably formed sleeve adapted to attach the stem 6 to whatever form of reel the market may afford, designated in each of the figures as sleeve 7', 7'' and 7'''.

In Figs. 1, 3, 4, and 4ª the sleeve 7 consists of a sheet metal plate, flat on its outer surface extending longitudinally of a flat cross bar, 11, of a tubular reel, and having one of its inner edges turned down and under so as to clamp about and grasp the lower or inner face of said bar 11 on which it is thereby sleeved.

The stem 6 is attached to (or made part of) the inner face of sleeve 7 and lies parallel to the bar 11.

A threaded hole in the stem 6 passing through sleeve 7 receives a screw 9, so that when the screw is turned inward it draws the flat top and turned over inner edge of sleeve 7 toward each other sufficiently to firmly clamp the sleeve to the cross bar 11, and hold the end of the brush 5 against the flange 16 of the spool 8.

The pressure of the end of the brush 5 against the flange 16 can be adjusted accurately, by adjusting the brush relative to its sleeve, or the brush 5 may be entirely withdrawn from contact with the flange 16 by moving the sleeve and clamping the same in the desired position merely by tightening the screw 9.

The sleeve 7 may extend almost the entire length of the bar, 11, if desirable, providing an outer cover 12, extending nearly to the outer reel plate ends, 14, 14, is provided since the brush end need be moved but a very small fraction of an inch; or the sleeve 7 may be only long enough to hold the stem 6 and have the slot 10, as preferred.

On reels of the most general construction whose head and tail plates are retained in position by a plurality of round longitudinal pillars, as 11' in Figs. 2, 5, 7, Fig. 2ª, Fig. 5ª and Fig. 3ª, the two lower ones 15, 15, nearest the rod handle, are called reel seat pillars.

To use my invention on such reels no new elements nor departures are required, it being merely desirable to slightly vary the form of sleeve 7.

As my invention is less conspicuous when attached between the reel seat pillars, although a slightly more elaborate sleeve is required, I show in Fig. 2, and enlarged and numbered in Fig. 2ª, such a sleeve 7' with a modified stem 6'', into which the brush 5' is affixed, and at one side of said brush a screw-head retaining hole through the outer lip of the clamping sleeve 7, and a threaded hole through its inner lip (shown much thickened in Fig. 2ª) are provided for the reception of the clamping screw 9'', and with a slot 10' (Fig. 4), which cannot be shown in Fig. 2ª, by means of which screw and slot the end of brush 5' can be adjusted relatively to the flange 16 of the spool, it being necessary to point the brush slightly upward or inward toward the axle as shown in Figs. 2ª, 3ª and 4ª so that a part or the whole of it may contact with said flange.

In Fig. 5ª I have shown a modification of Fig. 5 in which the stem 6''' has an exterior thread operating through a threaded hole in a block 7'''', laterally movable between the parallel cross-plate pillars, 15, 15, of the reel, and having concaved lateral faces which dove-tail with the convex surfaces of said pillars and retain it in position between them.

Turning the thumb-screw 9' moves end of the brush 5' into and out of contact with the flange of the spool at the end of the pillars 15, 15

In the modification shown in Fig. 6, the stem 6' does not move longitudinally in a direction parallel to the line of the axle, but on account of the concavity of the inner face of the spool flange, 16, the end of the brush 5 does not touch the spool when it is pushed toward the axle by means of the ordinary cap slide composed of the button 18 on the outside of the cap, the washer 17 on the inside thereof and the binding screw 19 threaded into the end of the stem 6' through a slot in the reel casing. The brush 5 is secured to the stem 6' by means of the set screw 9; but when the button 18 is drawn outward, away from the axle, operating like the usual drag and click buttons of reels, the stem 6' is drawn away from the axle, and the end of the brush 5 contacts lightly with the inside periphery and face of the spool flange.

The button 18 and the washer 17 serve to retain the device on the reel structure, of which 3 is the reel cap.

When the cap slide is moved outward toward the periphery of the cap, the end of the brush 5 contacts with the inner face of the flange 16 of the spool 8.

Many variations of the simple members illustrated as means for operating my resilient element, and many mechanical equivalents for them can be used without departure from my invention, for which I claim:—

1. In a fishing reel having end plates connected by cross bars parallel to its axle, and spool flanges adjacent to said end plates; the combination with said parts of a movable, resilient brake positioned on one of said bars and means for clamping it to said bar.

2. In a fishing reel having pillars parallel to the line of its axle and a revolving spool with flanges adjacent to said pillars, the combination of a separate, distinct element comprising a sleeved member slidably attached to one or more of and parallel to said pillars, and a resilient element capable of location in and out of contact with one of said flanges, and carried by said sleeved member, for the purpose set forth.

3. A device of the kind described for use on fishing reels and for preventing the overrunning of the line coiled thereon when casting a bait, consisting of a brush the free end of which engages the periphery of a flange of the reel's spool and the other end of which is retained by a stem slidably attached to a rigid member of said reel; and clamping means for securing the stem in the desired position.

4. The combination with a fishing reel of an adjustable brush attached to a rigid member thereof and means for retaining one end of said brush in frictional contact with the periphery of a flange of the spool of said reel for the purpose set forth.

In testimony whereof I affix my signature in presence of two witnesses.

FRED R. LIDDELL.

Witnesses:
WARREN P. TOGLE,
EMMA ZIEKE.